(12) United States Patent
Hisgen et al.

(10) Patent No.: US 8,671,218 B2
(45) Date of Patent: Mar. 11, 2014

(54) METHOD AND SYSTEM FOR A WEAK MEMBERSHIP TIE-BREAK

(75) Inventors: Andrew L. Hisgen, Mountainside, NJ (US); Thorsten Früauf, Ostfildern (DE); Ellard T. Roush, Burlingame, CA (US); Nicholas A. Solter, Colorado Springs, CO (US)

(73) Assignee: Oracle America, Inc., Redwood Shores, CA (US)

( * ) Notice: Subject to any disclaimer, the term of this patent is extended or adjusted under 35 U.S.C. 154(b) by 959 days.

(21) Appl. No.: 12/485,618

(22) Filed: Jun. 16, 2009

(65) Prior Publication Data

US 2010/0318610 A1    Dec. 16, 2010

(51) Int. Cl.
*G06F 15/16* (2006.01)
(52) U.S. Cl.
USPC .......................................................... 709/237
(58) Field of Classification Search
USPC .......................................................... 709/237
See application file for complete search history.

(56) References Cited

U.S. PATENT DOCUMENTS

| | | | |
|---|---|---|---|
| 5,870,540 A * | 2/1999 | Wang et al. ...................... 714/43 |
| 6,363,495 B1 * | 3/2002 | MacKenzie et al. ............ 714/4.5 |
| 6,993,635 B1 * | 1/2006 | Gazit et al. ...................... 711/162 |
| 7,380,163 B2 * | 5/2008 | Davies et al. ................. 714/5.11 |
| 7,478,263 B1 * | 1/2009 | Kownacki et al. ............ 714/4.11 |
| 7,739,677 B1 * | 6/2010 | Kekre et al. ..................... 717/168 |
| 7,843,811 B2 * | 11/2010 | Armstrong et al. ........... 370/221 |
| 7,908,251 B2 * | 3/2011 | Jones et al. ..................... 707/674 |
| 8,117,301 B2 * | 2/2012 | Kompella ...................... 709/224 |
| 2003/0005350 A1 * | 1/2003 | Koning et al. ..................... 714/4 |
| 2005/0108593 A1 * | 5/2005 | Purushothaman et al. ....... 714/4 |
| 2005/0195799 A1 * | 9/2005 | Burne et al. .................. 370/352 |
| 2005/0268154 A1 * | 12/2005 | Wipfel et al. ...................... 714/4 |
| 2007/0083641 A1 * | 4/2007 | Hu et al. ....................... 709/224 |
| 2008/0016394 A1 * | 1/2008 | Gunda et al. .................... 714/24 |
| 2010/0115338 A1 * | 5/2010 | Rao et al. ........................ 714/37 |
| 2010/0250788 A1 * | 9/2010 | Chen et al. ...................... 710/10 |

* cited by examiner

*Primary Examiner* — Joseph Avellino
*Assistant Examiner* — James Baron
(74) *Attorney, Agent, or Firm* — Osha Liang LLP

(57) ABSTRACT

In general, the invention relates to a method for managing a two-node cluster. The method includes determining, by a first server node, that a second server node is disconnected from the two-node cluster when a first heartbeat response is not received from the second server node and sending a first echo request from the first server node to a first external system, where the first external system is specified on each server node of the two-node cluster. The method further includes receiving a first echo response for the first echo request from the first external system at the first server node and, in response to receiving the first echo response, providing, by the first server node, services of the two-node cluster independent of the second server node.

20 Claims, 6 Drawing Sheets

METHOD AND SYSTEM FOR A WEAK MEMBERSHIP TIE-BREAK

BACKGROUND

A high-availability cluster typically refers to a service delivery platform that includes a tightly coupled group of servers (i.e., nodes), storage devices, and software. Each node in the cluster is interconnected to all other nodes in the cluster. The nodes in the cluster are configured such that the cluster as a whole provides the ability to run failover, parallel, and/or scalable resources. Thus, high-availability clusters are useful for industries that require high availability of applications and services (e.g., telecommunications industry, banking industry, internal information technology, etc.).

Further, each node is associated with a cluster and is configured to join the cluster it is associated with when the node is booted. However, if the cluster to which the node is configured to join is not present when the node is booted, then the node may attempt to create an instance of the cluster. In some situations, the cluster to which the node is to join is present but due to a communications failure between the node and the cluster, the node is not able to join the cluster and, thus, attempts to create an instance of the cluster. In this situation, the cluster may become partitioned resulting in multiple instances of the same cluster being created and executed. In other situations, a joining node is unable to join a existing cluster due to a network partition between the joining node and the existing cluster. The operation of two instances of a cluster is commonly referred to as "split-brain" and may result in data corruption or data loss. Further, if the operation of the two instances occur at staggered intervals, one of the instances of the cluster may be created and proceed to operate with out-dated configuration information, a condition commonly referred to as "amnesia."

To address the aforementioned issues, a node may only create a cluster if the node obtains a sufficient number of quorum votes to obtain a quorum. The quorum refers to the minimum number of quorum votes required to create an instance of the cluster, which is typically half the number of nodes in the cluster plus one. Further, each node in the cluster typically has one quorum vote. Thus, if a node attempting to form the cluster is connected to at least half of the other nodes in the cluster, then a quorum is reached and the instance of the cluster created.

While the aforementioned scheme is adequate for clusters containing a relatively large number of nodes, the scheme is not appropriate for two-node clusters. For a two-node cluster, the quorum votes required for a two-node cluster is 2 (i.e., 2 (number of nodes in cluster)/2+1).) Therefore, in the case of two-node clusters, if one node fails, then the remaining operational node is not able to create a cluster because the remaining operation node will never be able to obtain a quorum of 2.

The aforementioned scheme has been modified to address two-node clusters. Specifically, a quorum device is connected to the cluster such that each node in the cluster is able to communicate with the quorum device. The purpose of the quorum device is to provide an additional quorum vote. Thus, the quorum vote provided by the quorum device allows a single node in the two-node cluster to create a cluster in the event that the other node is not operational or experiencing communication difficulty. More specifically, each node in the two-node cluster includes functionality to reserve the quorum device, and thereby obtain the quorum vote associated with the quorum device. The ability to reserve the quorum device also provides a means for indicating, to the other node in the two-node cluster, that the quorum vote associated with the quorum device is in use, thereby preventing the node that does not have the quorum vote associated with the quorum device from creating an instance of the cluster.

Quorum devices are typically shared storage devices (such as SCSI disks) and are referred to as quorum disks. The quorum disk is connected to all nodes that have a potential of joining the cluster. The use of a quorum disk typically requires that the nodes in the cluster have the appropriate hardware and software for interacting with the quorum disk. Quorum devices may also be networked storage devices such as iSCSI-attached storage, a software application running on a networked system, etc.

SUMMARY

In general, in one aspect, the invention relates to a method for managing a two-node cluster. The method includes determining, by a first server node, that a second server node is disconnected from the two-node cluster when a first heartbeat response is not received from the second server node and sending a first echo request from the first server node to a first external system, where the first external system is specified on each server node of the two-node cluster. The method further includes receiving a first echo response for the first echo request from the first external system at the first server node and, in response to receiving the first echo response, providing, by the first server node, services of the two-node cluster independent of the second server node.

In general, in one aspect, the invention relates to a server node. The server node includes a processor and a memory including software instructions for enabling the processor to determine that a second server node is disconnected from the two-node cluster when a first heartbeat response is not received from the second server node and send a first echo request to a first external system, where the first external system is specified on each server node of the two-node cluster. The software instructions further enable the processor to receive a first echo response for the first echo request from the first external system and, in response to receiving the first echo response, provide services of the two-node cluster independent of the second server node.

In general, in one aspect, the invention relates to a computer readable medium including software instructions for managing a two-node cluster, the software instructions executable on a processor and including functionality to determine, by a first server node, that a second server node is disconnected from the two-node cluster when a first heartbeat response is not received from the second server node and send a first echo request from the first server node to a first external system, where the first external system is specified on each server node of the two-node cluster. The software instructions further include functionality to receive a first echo response for the first echo request from the first external system at the first server node and, in response to receiving the first echo response, provide, by the first server node, services of the two-node cluster independent of the second server node.

Other aspects of the invention will be apparent from the following description and the appended claims.

DETAILED DESCRIPTION

Figure 1:
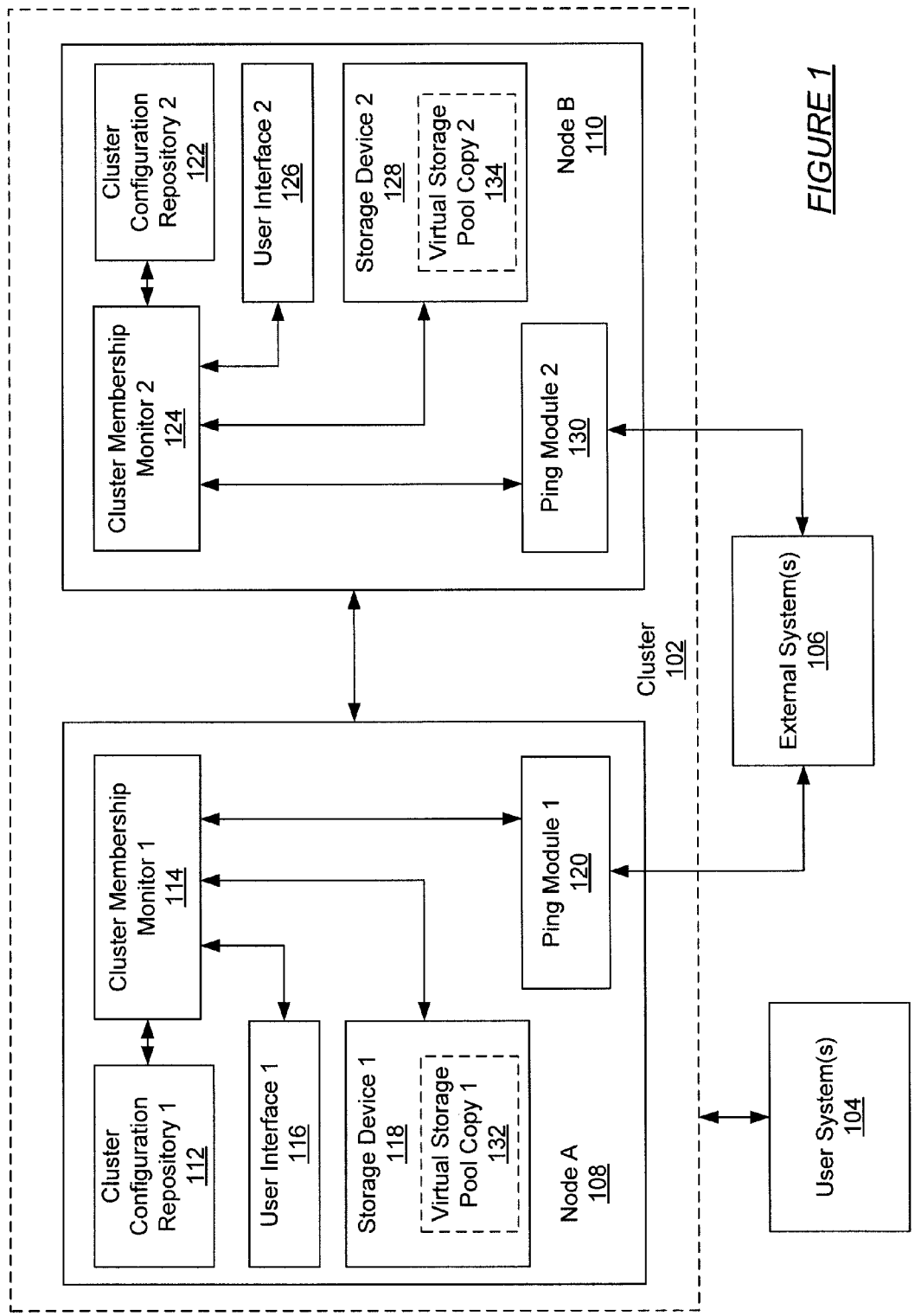
FIG. 1 shows a cluster in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for a weak membership tie-break. More specifically, embodiments of the invention provide a method and system for using external ping targets to resolve a split-brain scenario in a two-node cluster. Further, the external ping targets may be configured and supported without requiring the use of specialized external hardware designed to resolve split-brain scenarios (e.g., quorum disk, etc.).

FIG. 1 shows a system for performing a weak membership tie-break in accordance with one or more embodiment of the invention. The system includes a cluster (102) interacting with a user system(s) (104). The cluster (102) further includes a Node A (108) and a Node B (110). Though not shown in FIG. 1, each node (i.e., Node A (108) and Node B (110)) includes at least a processor, memory (e.g., random access memory (RAM), read-only memory (ROM), etc.), and a network interface. Further, each node (i.e., Node A (108) and Node B (110)) is connected to the other node in the cluster (102) by some form of network connection (e.g., wired, wireless, or any combination thereof). As shown in FIG. 1, each node (i.e., Node A (100), Node B (102)) includes a cluster membership monitor (CMM) (CMM 1 (114), CMM 2 (124)), a cluster configuration repository (CCR) (CCR 1 (112), CCR 2 (122)), a user interface (user interface 1 (116), user interface 2 (126)), a storage device (storage device 1 (118), storage device 2 (128)), and a ping module (ping module 1 (120), ping module 2 (130)). The ping module of each node further interacts with external system(s) (106). Each of the aforementioned components of FIG. 1 is described below.

In one or more embodiments of the invention, the cluster (102) is configured to provide services and/or resources to the user system(s) (104). More specifically, each node (i.e., Node A (108) and Node B (110)) in the cluster (102) may be configured to provide the services and/or resources to the user system(s) (104). Further, the nodes (i.e., Node A (108) and Node B (110)) may be configured to ensure availability of the services and/or resources using the CMM (CMM 1 (114), CMM 2 (122)).

In one or more embodiments of the invention, the CMM (CMM 1 (114), CMM 2 (122)) is configured to maintain a consistent cluster membership list (i.e., maintains a list of the current nodes in the cluster) when both nodes (Node A (108) and Node B (110)) are members in the same operational cluster (102). The cluster membership list maintained by the CMM (CMM 1 (114), CMM 2 (122)) is used to configure and manage the cluster. In one or more embodiments of the invention, the CMM (CMM 1 (114), CMM 2 (122)) is configured to monitor the connectivity of cluster members (i.e., Node A (108) and Node B (110)). More specifically, each node of the cluster (102) is configured to use the CMM (CMM 1 (114), CMM 2 (122)) to verify the heartbeat of the other nodes of the cluster (102). For example, the CMM (CMM 1 (114), CMM 2 (122)) may be configured to receive a heartbeat response, for example using the kernel or a daemon process, from a node in order to confirm the node is connected to the cluster (102). In this example, if a heartbeat response is not received from the node, the CMM (CMM 1 (114), CMM 2 (122)) may determine that the node is disconnected. In one or more embodiments of the invention, a node may be disconnected from the cluster (102) for a variety of reasons (e.g., node hardware failure, network failure, power outage, etc.). Those skilled in the art will appreciate that the CMM (CMM 1 (114), CMM 2 (122)) may be configured to interact with a separate module (not shown) to verify the heartbeat of the other nodes of the cluster (102).

Those skilled in the art will appreciate that the CMM (CMM 1 (114), CMM 2 (122)) is configured to verify the heartbeat of a node through a public network and/or private network. For example, the CMM (CMM 1 (114), CMM 2 (122)) may be configured to verify the heartbeat of nodes over a private network interface configured over a public network connection. In this example, the public network connection may utilize network components that are used to interact with the external system(s) (106), providing a better assessment as to whether a node (i.e., Node A (108) and Node B (110)) is connected to the external system(s) (106). In another example, the CMM (CMM 1 (114), CMM 2 (122)) may be configured to verify the heartbeat of nodes through multiple network connections (e.g., multiple private networks, a private network and a public network, etc.). In this example, the redundant network connections may decrease the likelihood of a complete connectivity failure in the cluster (102).

In one or more embodiments of the invention, the CMM (CMM 1 (114), CMM 2 (122)) is configured to create an instance of the cluster when connectivity fails between nodes in the cluster (102). In this case, the CMM (CMM 1 (114), CMM 2 (122)) may be configured to use a ping module (ping module 1 (120), ping module 2 (130)) to determine whether the instance of the cluster should be created. For example, the CMM (CMM 1 (114), CMM 2 (122)) may be configured to manage a list of external system(s) (106) that are pinged when connectivity fails within the cluster (102). In this example, the list of external system(s) (106) may be specified by a user using the user interface (user interface 1 (116), user interface 2 (126)). In one or more embodiments of the invention, the ping module (ping module 1 (120), ping module 2 (130)) is configured to ping the external system(s) (106) to determine whether a node (i.e., Node A (108) and Node B (110)) is connected to the external system(s) (106). More specifically, the ping module (ping module 1 (120), ping module 2 (130)) is configured to send echo requests to and receive echo responses from the external system(s) (106) to confirm connectivity. In one or more embodiments of the invention, the CMM (CMM 1 (114), CMM 2 (122)) is configured to create an instance of the cluster if echo response(s) are received by the ping module (ping module 1 (120), ping module 2 (130)) from the external system(s) (106) (i.e., create an instance of the cluster if a quorum is obtained). An example of managing a cluster (102) using external system(s) (106) is described with respect to FIG. 3 below.

In one or more embodiments of the invention, an external system (106) may be any device not included in the cluster (102) and capable of responding to an echo request. Examples of external system(s) (106) include, but are not limited to, a router, a gateway device, a web server, a printer, or any other device that is capable of being pinged. In one or more embodiments of the invention, the external system (106) may reside on the same subnet as the cluster (102). In other embodiments, the external system (106) may reside in a different subnet than the cluster (102).

In one or more embodiments of the invention, the CMM (CMM 1 (114), CMM 2 (122)) may be further configured to monitor the availability of external system(s) (106) using the ping module (ping module 1 (120), ping module 2 (130)). More specifically, the CMM (CMM 1 (114), CMM 2 (122)) may be configured to use the ping module (ping module 1 (120), ping module 2 (130)) to intermittently ping the external system(s) (106). In this case, if an echo response is not received from the external system(s) (106), the CMM (CMM 1 (114), CMM 2 (122)) may be configured to notify an administrator that the external system(s) (106) are not available.

In one embodiment of the invention, the ping module (ping module 1 (120), ping module 2 (130)) is configured to send echo requests using Internet Protocol. More specifically, the echo requests may be IP packets generated and sent by the ping module (ping module 1 (120), ping module 2 (130)) to the external system(s). Further, the external system(s) (106) may be configured to send echo responses in the form of IP packets back to the appropriate node. Those skilled in the art will appreciate that the echo requests and echo responses may be sent using other networking protocols.

In one or more embodiments of the invention, the CMM (CMM 1 (114), CMM 2 (122)) is further configured to interface with the CCR (CCR 1 (112), CCR 2 (122)), the user interface (user interface 1 (116), user interface 2 (126)), and the storage device (storage device 1 (118), storage device 2 (128)). In one or more embodiments of the invention, the CCR (CCR 1 (112), CCR 2 (122)) is a replicated data store (e.g., one CCR per node) that is configured to persistently store cluster configuration information (e.g., node names, virtual storage pool information, etc.). In one or more embodiments of the invention, the user interface (user interface 1 (116), user interface 2 (126)) is configured to allow the user to configure and send commands to the CMM (CMM 1 (114), CMM 2 (122)).

In one or more embodiments of the invention, the storage device (storage device 1 (118), storage device 2 (128)) is configured to store data used by the cluster (102) to provide resources and/or services to the user system(s) (104) as described above. Further, the storage device (storage device 1 (118), storage device 2 (128)) may be configured to participate in a virtual storage pool (not shown). More specifically, each storage device (storage device 1 (118), storage device 2 (128)) may include a virtual storage pool copy (virtual storage pool copy 1 (132), virtual storage pool copy 2 (134)). The virtual storage pool may be configured to abstract the physical location (i.e., storage device 1 (118) and storage device 2 (128)) of data such that each node (Node A (108), Node B (110)) has access to a shared set of data. In other words, for example, modifications performed on the virtual storage pool copy 1 (132) by Node A (108) may be propagated to the virtual storage pool copy 2 (134) on Node B (110). Those skilled in the art will appreciate that each node (Node A (108), Node B (110)) may be configured to utilize any number of storage devices to store configuration information and a corresponding copy of the virtual storage pool. Further, each of the configuration information and the virtual storage pool data may be stored on a separate storage device.

In one or more embodiments of the invention, each node (Node A (108), Node B (110)) is configured to receive and process Small Computer System Interface (SCSI) commands for the storage devices (storage device 1 (118), storage device 2 (128)). More specifically, each node (Node A (108), Node B (110)) may be configured to export data to a corresponding storage device (storage device 1 (118), storage device 2 (128)) as a SCSI target, and each node (Node A (108), Node B (110)) may be configured to act as an SCSI initiator when accessing an SCSI target (e.g., storage device 1 (118) and storage device 2 (128)). In this case, the SCSI initiators and SCSI targets are configured to interact with the virtual storage pool, where each virtual storage pool copy (virtual storage pool copy 1 (132), virtual storage pool copy 2 (134)) corresponds to a storage device (storage device 1 (118), storage device 2 (128)) acting as a SCSI target.

Those skilled in the art will appreciate that the SCSI initiators (e.g., Node A (108) and Node B (110)) and SCSI targets (e.g., storage device 1 (118) and storage device 2 (128)) may communicate using a variety of transport protocols. Examples of transport protocols include, but are not limited to, Internet SCSI (iSCSI), Fibre Channel, Serial Attached SCSI (SAS), and iSCSI Extensions for Remote Direct Memory Access (iSER). In one or more embodiments of the invention, all SCSI communication is performed using the connection between the nodes (Node A (108), Node B (110)). In this case, SCSI communications may only occur when the nodes (Node A (108), Node B (110)) are members of the same cluster.

Those skilled in the art will appreciate that a split-brain scenario may cause copies of a virtual storage pool (virtual storage pool copy 1 (132), virtual storage pool copy 2 (134)) stored on different nodes (i.e., Node A (108), Node B (110)) to become unsynchronized. In this case, the data stored in the virtual storage pool and/or logs for the storage device (storage device 1 (118), storage device 2 (128)) may be analyzed to detect and resolve the split-brain scenario. More specifically, the data stored in the virtual storage pool and/or logs for the storage device (storage device 1 (118), storage device 2 (128)) may be analyzed to determine that one of the nodes (Node A (108), Node B (110)) is the winning node, where the winning node contains the winning copy of the virtual storage pool. In this case, the nodes (Node A (108), Node B (110)) may be configured to discard and repopulate the other copies of the virtual storage pool with the winning copy. An example of synchronizing copies of a virtual storage pool is described with respect to FIG. 4 below.

In one or more embodiments of the invention, each node (Node A (108), Node B (110)) may be configured to monitor the configuration information stored in the CCR (CCR 1 (112), CCR 2 (122)) for modifications. In this case, each node (Node A (108), Node B (110)) may determine whether modifications were performed to the configuration information during a split-brain scenario (i.e., while Node A (108) and Node B (110) are not in the same cluster) before attempting to automatically reform the cluster (102). For example, if the configuration information is only modified on a single node during a split-brain scenario, the single node may automatically be designated as the winning node. In this example, the modifications to the configuration information on the winning node are propagated to the losing node when the cluster is reformed.

Figure 2:
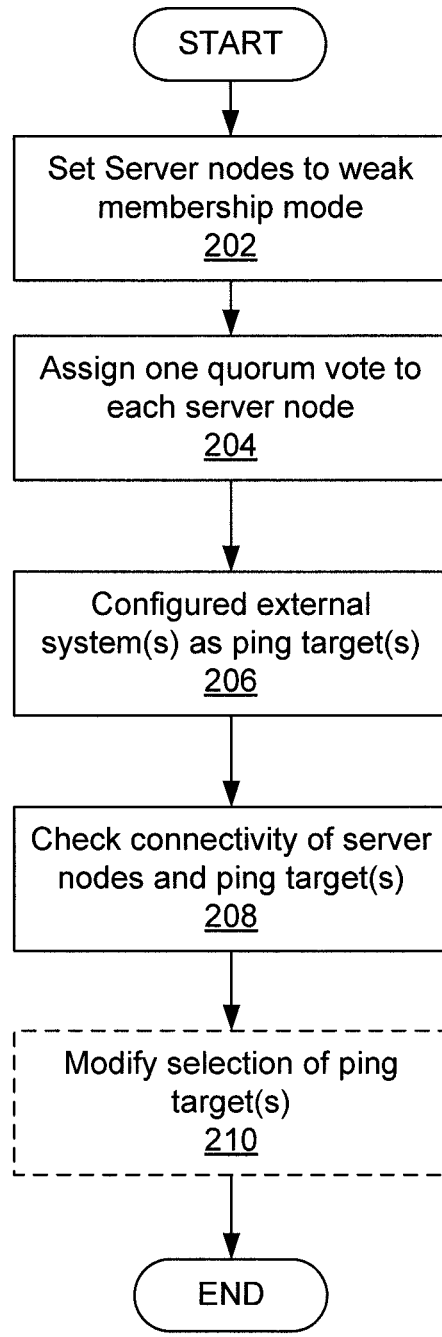
FIGS. 2-5 show flowcharts in accordance with one embodiment of the invention.

FIG. 2 shows a flow chart for configuring a cluster in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 202, the nodes of the cluster are set to a weak membership mode. In one or more embodiments of the invention, the weak membership mode specifies that the cluster should resolve any connectivity failures between nodes using external system(s). Further, the weak membership mode may require that the cluster only include two nodes.

Those skilled in the art will appreciate that the weak membership mode may be an alternate configuration of the cluster. For example, the cluster may initially be configured in a strong membership mode that ensures only a single cluster is formed in all situations. In this example, setting the cluster to the weak membership mode may be beneficial if the cluster does not have sufficient resources to support a strong membership mode (e.g., quorum disk, etc.).

In Step 204, the minimum quorum vote required to form a cluster is set to one. In other words, each node in the cluster is only required to obtain one quorum vote before forming a one-node cluster after a connectivity failure. For example, the weak membership mode may provide for either one or two quorum votes in a two-node cluster. In this example, either of the nodes in the two-node cluster may be authorized to form the cluster after obtaining a single quorum vote.

In Step 206, external system(s) are specified as ping targets. More specifically, the cluster is configured with a list of external system(s) that a node should successfully ping in order to obtain a quorum vote. Those skilled in the art will appreciate that any number of external system(s) may be specified. Further, each external system may be accessible to the nodes of the cluster through a public network, a private network, or combination thereof. In one or more embodiments of the invention, the cluster is configured to require that each external system be successfully pinged before a quorum vote is obtained by the node. In other embodiments, the cluster is configured to only require that a single external system be successfully pinged before a quorum vote is obtained by the node.

In one or more embodiments of the invention, the external system(s) do not require specialized cluster hardware and/or software to interact with the nodes of the cluster. In other words, an external system may be any device capable of responding to an echo request. Further, the external system may be configured to perform functionality unrelated to the cluster (e.g., printer, network router, etc.).

At this stage, the connectivity between the nodes and the external system(s) (i.e., ping target(s)) may be confirmed (208). For example, the nodes may ping the external system(s) to confirm the connectivity between the nodes and the external system(s). In this example, connectivity with an external system is confirmed if an echo response is received from the external system. Those skilled in the art will appreciate that if an echo response is not received from the external system, the user may be prompted to correct the configuration for the external system.

Optionally, in Step 210, the administrator may modify the selection of external system(s) utilized by the cluster as ping target(s). In one or more embodiments of the invention, the external system(s) are configurable while the cluster continues to provide resources and/or services.

Figure 3:
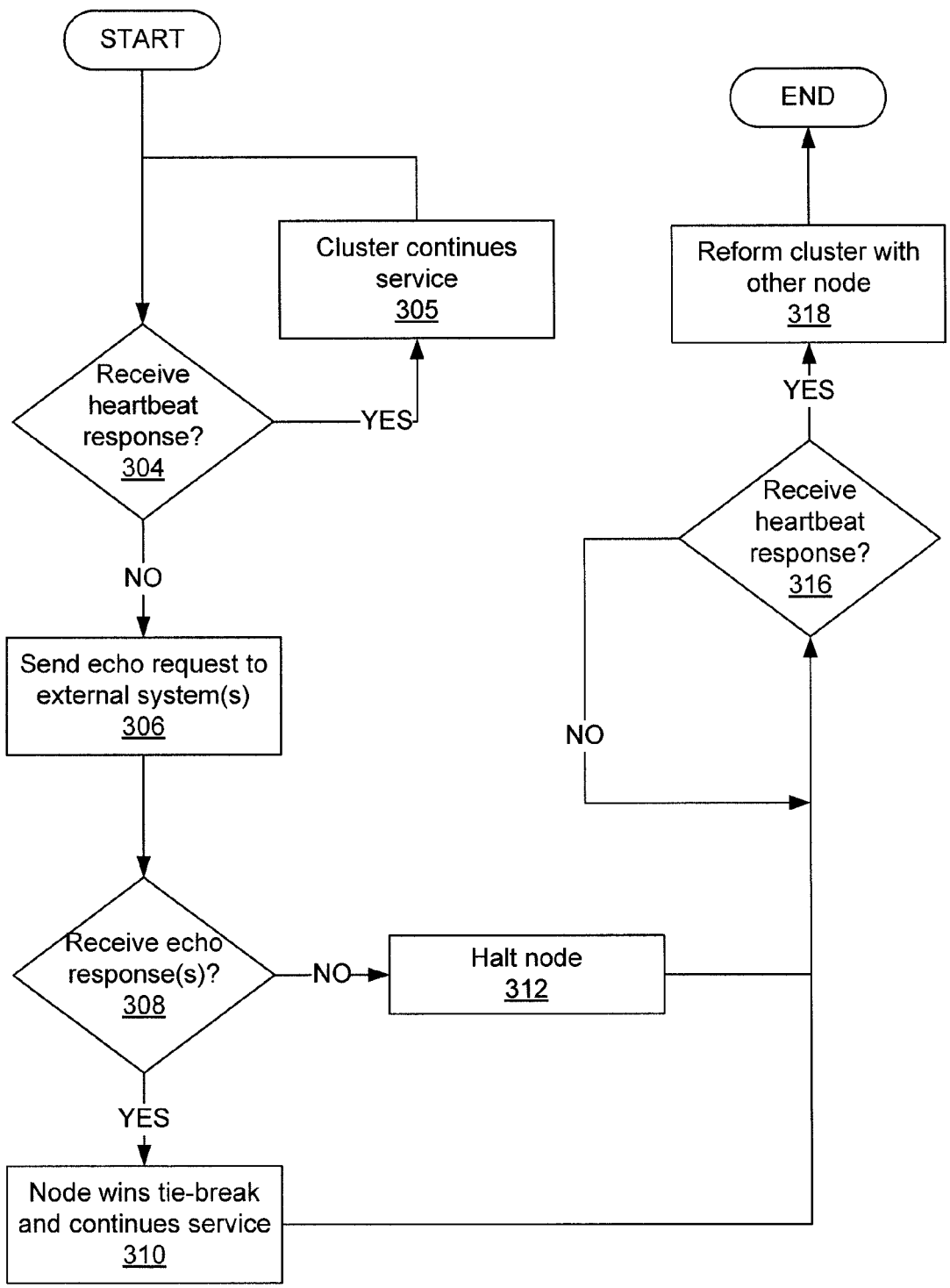

FIG. 3 shows a flow chart for managing a cluster in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 304, a determination is made by the node as to whether a heartbeat response is received. If a heartbeat response is received, both nodes may continue to provide resources and/or services as members of the two-node cluster (Step 305). If a heartbeat response is not received, the node determines that connectivity with the other node has failed and attempts to determine whether to form a one-node cluster by sending echo request(s) to the external system(s) (Step 306).

In Step 308, a determination is made by the node as to whether echo response(s) are received from the external system(s). If echo response(s) are not received, the node halts (Step 312). The halting of the node reduces the chance that multiple one-node clusters will form, which reduces the occurrence of a split-brain scenario.

In the case where the node is halted, the node may then boot automatically or an administrator may manually boot the machine. At this stage, the node may be in the same state, in which case the node will not form a cluster. Alternatively, after booting the node may be capable of rejoining the two-node cluster. More specifically, the node may intermittently determine whether a heartbeat response is received from the other node (Step 316). If a heartbeat response is not received, step 316 is repeated. If a heartbeat response is received, the node may be capable of rejoining the other node in the two-node cluster (Step 318). At this stage, an administrator may manually reform the cluster. In the case a split-brain scenario is detected, the cluster may be reformed when the administrator designates one node as a winning node and one node as a losing node, where the losing node is rejoined to the cluster after rebooting. In another case, the cluster may be automatically reformed if at least one of the nodes did not create a separate instance of the cluster when connectivity between the nodes failed (i.e., no more than one instance of the cluster was created after connectivity failed).

If echo response(s) are received from the external system(s), the node wins the tie-break (i.e., determines that a one-node cluster should be formed) and continues to provide the resources and/or services independent of the other node (Step 310). In this case, the node may create an instance of the cluster that does not include the other node. Those skilled in the art will appreciate that a common cause for a split-brain scenario is the failure of one node to communicate. Requiring receipt of the echo response(s) to form a one-node cluster ensures that a healthy node survives as the one-node cluster in most cases. In other words, requiring receipt of the echo response(s) acts as a tie-break mechanism for the most common case of the split-brain in the cluster. Further, those skilled in the art will appreciate the invention is not limited to only addressing the common case of the split-brain in the cluster.

At this stage, the node may continue to provide services and/or resources as a member of the instance of the cluster until connectivity is restored with the other node, allowing the two-node cluster to be reformed, as discussed above in steps 316-318.

In one or more embodiments of the invention, both nodes in the two-node cluster may receive echo response(s) from the external system(s). In this case, each node continues to provide services and/or resources in a separate one-node cluster, causing a split-brain scenario to develop. In another example, both nodes in the two-node cluster may fail to receive echo response(s) from the external system(s). In this case, both nodes halts (Step 312).

Figure 4:
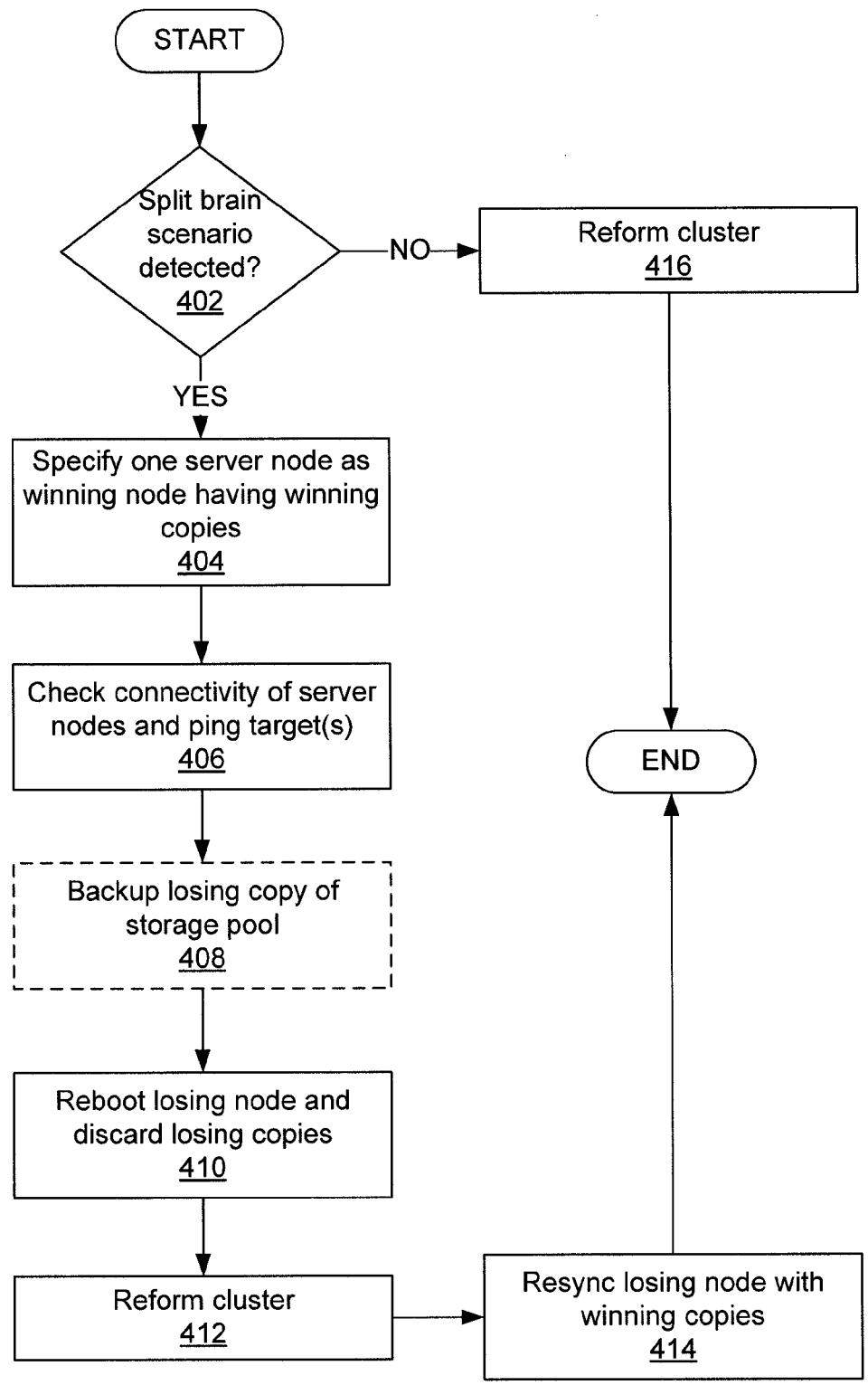

FIG. 4 shows a flow chart for reforming a cluster after connectivity in the cluster is restored in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 402, a determination is made by the node as to whether a split-brain scenario is detected. In one or more embodiments of the invention, a split-brain scenario occurs when multiple nodes in an original cluster reconfigure and create instances of the cluster after connectivity in the original cluster fails. In this case, each of the instances of the cluster continues to provide resources and/or services independent of the other nodes of the original cluster. When inter-node communications are operating properly again and before a two-node cluster is formed, an administrator may analyze the data of each of the cluster to determine if the data of each node has diverged. For example, the logs of each of the clusters may be analyzed to determine whether data modifications were performed on either of the cluster nodes. In this example, each cluster may include an unsynchronized copy of a virtual storage pool of the original cluster, indicating the presence of a split-brain scenario. If a split-brain scenario is not detected, the original cluster may be reformed (Step 416).

In Step 404, if a split-brain scenario is detected, one of the nodes is specified as the winning node, where the winning node includes a winning copy of the cluster configuration information and/or a winning copy of the virtual storage pool. For example, an administrator may review the logs of each of the instances of the cluster and/or the data contained in the corresponding copy of the virtual storage pool to determine which node should be specified as the winning node. In another example, the clusters may automatically determine which node should be specified as the winning node based on a variety of criteria (e.g., most recent update timestamp, quantity of modifications in each copy, etc.). In one or more embodiments of the invention, the winning copy of the virtual storage pool includes the data that is considered valid (i.e., data to be used by the original cluster when restored). In this case, all other copies of the virtual storage pool will be specified as losing copies, which are discarded when the original cluster is restored.

Alternatively, those skilled in the art will appreciate that if a split-brain scenario is detected, the nodes of the cluster may continue to separately provide services and/or resources as single node clusters to ensure that the availability of the services and/or resources is maintained. In this case, the nodes may continue to act as separate single node clusters until the original cluster is manually reformed by an administrator.

In Step 406, the connectivity of the nodes of the cluster and the ping target(s) is confirmed. More specifically, the connectivity between each of the nodes in the cluster and the connectivity between each of the nodes and each of the ping target(s) may be confirmed as described above with respect to FIG. 1. In one or more embodiments of the invention, confirming the connectivity of the nodes of the cluster and the ping target(s) ensures that the nodes are operational and able to reform the original cluster. Those skilled in the art will appreciate that other aspects of the nodes (e.g., available memory, etc.) may also be verified to ensure that the nodes are able to reform the original cluster.

Optionally, in Step 408, a backup of the losing copies of the virtual storage pool is created. In this case, the backup may be reviewed by an administrator to determine if the losing copies contain any valid data. Those skilled in the art will appreciate that the valid data contained in the losing copies may be restored to the virtual storage pool in a variety of manners (e.g., manual merge, etc.).

In Step 410, the losing copy of the virtual storage pool is discarded, and the node including the losing copy (i.e., losing node) of the virtual storage pool is rebooted. For example, prior to rebooting the losing node, the losing copy of the virtual storage pool is removed from the virtual storage pool for all nodes in the original cluster. In this example, the losing node may then be rebooted, and during the booting process of the losing node, the original cluster is reformed (Step 412).

Subsequent to or during the reformation of the original cluster, the losing node may be resynchronized with the winning copy of the cluster configuration information and/or the winning copy of the virtual storage pool. In this case, a new copy of the virtual storage pool is created on the losing node using the winning copy of the virtual storage pool. The virtual storage pool may then be populated with the new copy of the virtual storage pool on the losing node (Step 414). Once restored, the original cluster may continue to provide services and/or resources.

Figure 5:
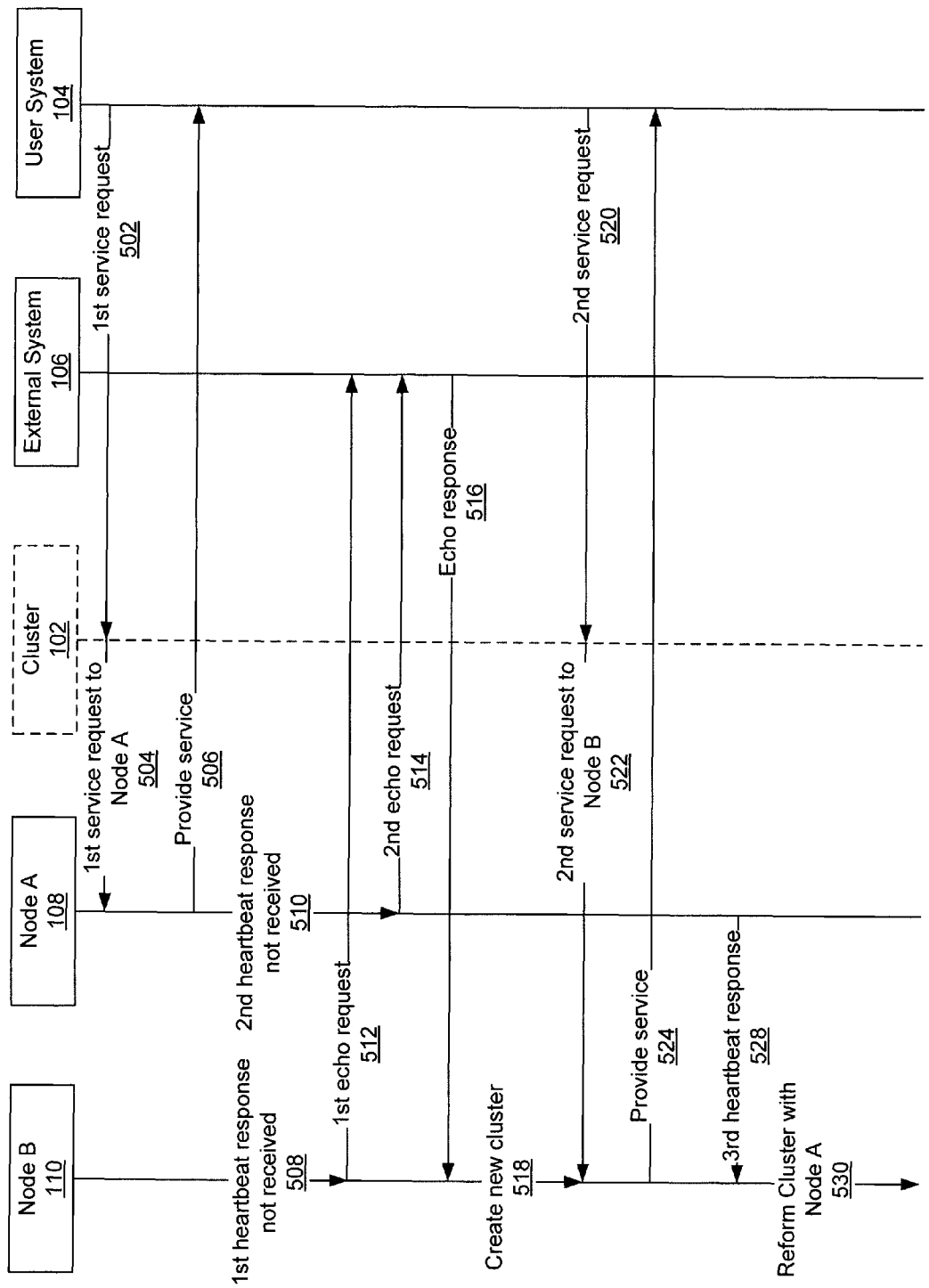

FIG. 5 shows a flow chart for managing a cluster (102) in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention. Those skilled in the art will appreciate that the following example is provided for exemplary purposes only and accordingly should not be construed as limiting the scope of the invention.

In Step 502, a user system (104) sends a first service request to the cluster (102). The first service request may be sent based on input from a user (not shown) of the user system (104). In this example, the cluster (102) is an abstract entity including node A (108) and node B (110), where each node in the cluster (102) is configured to provide a service. In other words, the user system (104) may perceive the service as being provided by the cluster (102).

The cluster (102) may receive and route the first service request to node A (108) (Step 504). The first service request may be routed based on the availability of node A (108) in the cluster (102). In Step 506, node A (108) provides the service to the user system (104).

In Step 508 and Step 510, when a heartbeat response is not received by either node, node A (108) and node B (110) each determine that the cluster (102) is disconnected. At this stage, each node will determine whether the node can successfully ping an external system (106) and, thus, be allowed to form a one-node cluster.

In Step 512, node B (110) sends a first echo request to the external system (106). Similarly, in step 514, node A (108) sends a second echo request to the external system (106). When an echo response is not received by node A (108), node A (108) is unable to ping the external system (106) and discontinues providing services and/or resources.

In Step 516, the external system (106) sends an echo response to node B (110). Once node B (110) receives the echo response from the external system (106), node B (110) has successfully pinged the external server (106) and forms an instance of the cluster (Step 518). The instance of the cluster may then continue to provide services and/or resources to the user system (104). In this case, the instance of the cluster may act as the cluster (102) with respect to the user system (104). In other words, the user system (104) may continue to interact with the cluster (102) without being aware of the disconnect between node A (108) and node B (110).

In Step 520, the user system (104) sends a second service request to the cluster (102), which now corresponds to the instance of the cluster formed by node B (110) in Step 518. As node B (110) is the only member of the instance of the cluster, the second service request is routed to node B (Step 522). At this stage, node B (110) provides the service to the user system (104) (Step 524).

In Step 528, node A (108) sends a first heartbeat response to Node B (110). Once node B (110) receives the heartbeat response from node A (108), connectivity between node B (110) and node A (108) is confirmed as restored, and node B (110) is capable of rejoining node A (108) to reform the cluster (102) (Step 530). Specifically, because no data modifications were performed on node A (108) while disconnected from the cluster (102), node A (108) may automatically request to be rejoined to the cluster (102). In this case, the modifications to the cluster configuration repository of node B (110) may be propagated to node A (108) when the cluster (102) is reformed.

Figure 6:
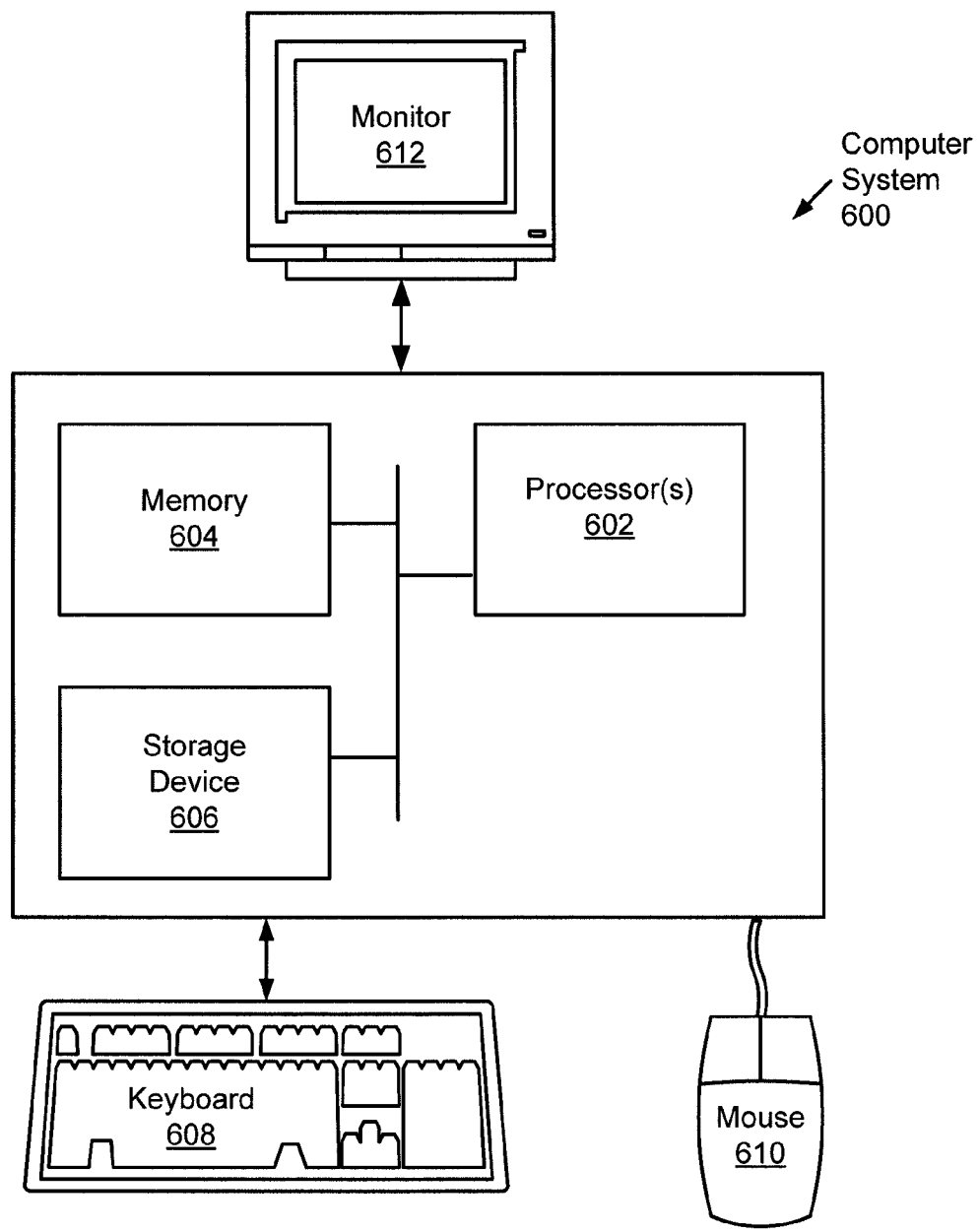
FIG. 6 shows a computer system in accordance with one embodiment of the invention.

The invention may be implemented on virtually any type of computer regardless of the platform being used. For example, as shown in FIG. 6, a networked computer system (600) includes at least one processor (602) (e.g., multi-core processor, multiple processors, etc.), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (600) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

Further, the invention may be implemented on a virtual machine executing a guest operating system on the aforementioned computer (600). The virtual machine may be implemented using virtualization technology. Examples of virtualization technology include, but are not limited to, usage of Xen®, VMware®, or any other type of virtual machine environment. (Xen® is a registered trademark of Citrix Systems, Inc. of Fort Lauderdale, Fla.; VMware® is a registered trademark of VMWare, Inc. of Palo Alto, Calif.)

In one or more embodiments of the invention, software instructions to perform embodiments of the invention, when executed by a processor, may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a two-node cluster comprising a first server node and a second server node, comprising:
   sending, by the first server node comprising a first copy of a virtual storage pool, a first heartbeat;
   sending, by the second server node comprising a second copy of the virtual storage pool, a second heartbeat;
   determining, by the first server node and in response to not receiving the second heartbeat from the second server node, that the second server node is disconnected from the two-node cluster;
   sending, by the first server node and in response to determining that the second server node is disconnected, a first echo request from to a first external system, wherein the first external system is specified on the first server node and the second server node of the two-node cluster;
   sending, by the second server node and in response to not receiving the first heartbeat from the first server node, a second echo request to the first external system;
   receiving, by the first server node, a first echo response for the first echo request from the first external system, wherein the first echo response indicates that the first server node is a winner and the second server node is a loser in a tie-break mechanism;
   halting, by the second server node and in response to not receiving a second echo response from the first external system after sending the second echo request, cluster services offered by the second server node; and
   providing, by the first server node and in response to receiving the first echo response, services of the two-node cluster independent of the second server node.

2. The method of claim 1, further comprising:
   determining, after the second server node halts cluster services and by the first server node, that the second server node is reconnected to the two-node cluster when a third heartbeat response is received from the second server node; and
   rejoining, by the first server node, the second server node to reform the two-node cluster.

3. The method of claim 2, further comprising:
   determining that a split-brain scenario has occurred in the two-node cluster;
   designating, on the first server node, the first copy of the virtual storage pool as a winning copy of the virtual storage pool and a winning copy of cluster configuration information, wherein the virtual storage pool is distributed across the two-node cluster;
   discarding the second copy of the virtual storage pool and a losing copy of the cluster configuration information on the second server node; and
   resynchronizing the second server node of the two-node cluster using the winning copy of the virtual storage pool and the winning copy of the cluster configuration information.

4. The method of claim 2, further comprising:
   receiving a fourth heartbeat response from the second server node through a public network,
   wherein the third heartbeat response is transmitted through a private network.

5. The method of claim 4, wherein the public network is associated with a user of the services of the two-node cluster.

6. The method of claim 1, further comprising:
   sending, by the first server node, a third echo request to a second external system, wherein the second external system is specified on the first server node and the second server node of the two-node cluster; and
   receiving a third echo response for the third echo request from the second external system,
   wherein providing the services of the two-node cluster independent of the second server node is further in response to receiving the third echo response.

7. The method of claim 1, wherein the first external system is not a member of the two-node cluster, and wherein the first external system is a router.

8. A two-node cluster, comprising:
a first server node comprising:
a first processor;
a first storage device storing a first copy of a virtual storage pool; and
a first memory comprising a first set of software instructions executing on the first processor and configured to:
send a first heartbeat;
send, in response to not receiving a second heartbeat, a first echo request to a first external system, wherein the first external system is specified on the first server node of the two-node cluster;
receive a first echo response for the first echo request from the first external system, wherein the first echo response indicates that the first server node is a winner in a tie-break mechanism; and
provide, in response to receiving the first echo response, services of the two-node cluster; and
a second server node, comprising:
a second processor;
a second storage device storing a second copy of the virtual storage pool; and
a second memory comprising a second set of software instructions executing on the second processor and configured to:
send the second heartbeat;
send, in response to not receiving the first heartbeat, a second echo request to the first external system, wherein the first external system is specified on the second server node; and
halt, in response to not receiving a second echo response from the first external system after sending the second echo request, cluster services offered by the second server node.

9. The two-node cluster of claim 8, wherein the first set of software instructions are further for enabling the first processor to:
determine, after the second server node halts cluster services, that the second server node is reconnected to the two-node cluster when a third heartbeat response is received from the second server node; and
rejoin the first server node with the second server node to reform the two-node cluster.

10. The two-node cluster of claim 9, wherein the first set of software instructions are further for enabling the first processor to:
determine that a split-brain scenario has occurred in the two-node cluster; and
designate, on the first server node, the first copy of the virtual storage pool as a winning copy of the virtual storage pool and a winning copy of cluster configuration information, wherein the virtual storage pool is distributed across the two-node cluster;
discard the second copy of the virtual storage pool and a losing copy of the cluster configuration information on the second server node; and
resynchronize the second server node of the two-node cluster using the winning copy of the virtual storage pool and the winning copy of the cluster configuration information.

11. The two-node cluster of claim 9, wherein the first set of software instructions are further for enabling the first processor to:
receive a fourth heartbeat response from the second server node through a public network,
wherein the third heartbeat response is transmitted through a private network.

12. The two-node cluster of claim 11, wherein the public network is associated with a user of the services of the two-node cluster.

13. The two-node cluster of claim 8, wherein the first set of software instructions are further for enabling the first processor to:
send a second echo request to a second external system, wherein the second external system is specified on each server node of the two-node cluster; and
receive a second echo response for the second echo request from the second external system,
wherein providing the services of the two-node cluster independent of the second server node is further in response to receiving the second echo response.

14. The two-node cluster of claim 8, wherein the first external system is not a member of the two-node cluster.

15. A non-transitory computer readable medium comprising software instructions for managing a two-node cluster comprising a first server node and a second server node, the software instructions executable on at least one processor and comprising functionality to:
send, by the first server node comprising a first copy of a virtual storage pool, a first heartbeat;
send, by the second server node comprising a second copy of the virtual storage pool, a second heartbeat;
determine, by the first server node and in response to not receiving the second heartbeat from the second server node, that the second server node is disconnected from the two-node cluster;
send, by the first server node and in response to determining that the second server node is disconnected, a first echo request to a first external system, wherein the first external system is specified on the first server node and the second server node of the two-node cluster;
send, by the second server node and in response to not receiving the first heartbeat from the first node, a second echo request to the first external system;
receive, by the first server node, a first echo response for the first echo request from the first external system, wherein the first echo response indicates that the first server node is a winner and the second server node is a loser in a tie-break mechanism;
halt, by the second server node and in response to not receiving a second echo response from the first external system after sending the second echo request, cluster services offered by the second server node; and
provide, by the first server node and in response to the first echo response, services of the two-node cluster independent of the second server node.

16. The non-transitory computer readable medium of claim 15, the instructions further comprising functionality to:
determine, after the second server node halts cluster services and by the first server node, that the second server node is reconnected to the two-node cluster when a third heartbeat response is received from the second server node; and
rejoin, by the first server node, the second server node to reform the two-node cluster.

17. The non-transitory computer readable medium of claim 16, the instructions further comprising functionality to:
determine that a split-brain scenario has occurred in the two-node cluster;

designate, on the first server node, the first copy of the virtual storage pool as a winning copy of the virtual storage pool and a winning copy of cluster configuration information, wherein the virtual storage pool is distributed across the two-node cluster;

discard the second copy of the virtual storage pool and a losing copy of the cluster configuration information on the second server node; and resynchronize the second server node of the two-node cluster using the winning copy of the virtual storage pool and the winning copy of the cluster configuration information.

18. The non-transitory computer readable medium of claim 16, the instructions further comprising functionality to:

receive a fourth heartbeat response from the second server node through a public network, wherein the third heartbeat response is transmitted through a private network.

19. The non-transitory computer readable medium of claim 15, the instructions further comprising functionality to:

send, by the first server node, a third echo request to a second external system, wherein the second external system is specified on the first server node and the second server node of the two-node cluster; and receive a second echo response for the second echo request from the second external system, wherein providing the services of the two-node cluster independent of the second server node is further in response to receiving the second echo response.

20. The non-transitory computer readable medium of claim 15, wherein the first external system is not a member of the two-node cluster, and wherein the first external system is a web server.

* * * * *

UNITED STATES PATENT AND TRADEMARK OFFICE
CERTIFICATE OF CORRECTION

| | | |
|---|---|---|
| PATENT NO. | : 8,671,218 B2 | |
| APPLICATION NO. | : 12/485618 | |
| DATED | : March 11, 2014 | |
| INVENTOR(S) | : Andrew L. Hisgen et al. | |

It is certified that error appears in the above-identified patent and that said Letters Patent is hereby corrected as shown below:

In the Claims:

At column 12, claim number 1, line number 9:

"a first echo request from to a first external system"

should read

--a first echo request to a first external system--

Signed and Sealed this
Tenth Day of June, 2014

Michelle K. Lee
*Deputy Director of the United States Patent and Trademark Office*